United States Patent [19]

Raveglia et al.

[11] 4,233,577
[45] Nov. 11, 1980

[54] FLAT TRANSMISSION PATH FOR COMMUNICATION SYSTEM

[75] Inventors: Dalmazio Raveglia; Carlo Lonati, both of Milan; Giancarlo Macchi, Arzago D'Adda, all of Italy

[73] Assignee: Societa Italiana Telecomunicazioni Siemens S.p.A., Milan, Italy

[21] Appl. No.: 47,586

[22] Filed: Jun. 11, 1979

[30] Foreign Application Priority Data

Jun. 12, 1978 [IT] Italy .................................. 24464 A/78

[51] Int. Cl.³ .......................... H01P 5/12; H01P 3/00; H01B 11/00
[52] U.S. Cl. .................................... 333/136; 333/238; 174/36; 174/117 FF
[58] Field of Search ............... 333/238, 246, 243, 236, 333/100, 136; 174/36, 117 FF

[56] References Cited

U.S. PATENT DOCUMENTS

| | | | |
|---|---|---|---|
| 3,025,480 | 3/1962 | Guanella | 333/243 X |
| 3,609,613 | 9/1971 | Horn | 333/238 X |

*Primary Examiner*—Paul L. Gensler
*Attorney, Agent, or Firm*—Karl F. Ross

[57] ABSTRACT

A transmission path for a pulse-type communication system comprises two flat outer conductors and one flat inner conductor separated from one another by layers of dielectric material such as Teflon. The maximum effective thickness of the conductors is on the order of magnitude of the penetration depth of the current. The stack of conductive and nonconductive layers is flanked by two ferrite strips of the same height as the stack and in contact therewith, these strips serving to gather the laterally emanating lines of force into closed loops alongside the stack. At least one of the strips may be subdivided into sections separated by gaps through which branch leads can extend into contact with the flat conductors.

5 Claims, 6 Drawing Figures

FLAT TRANSMISSION PATH FOR COMMUNICATION SYSTEM

FIELD OF THE INVENTION

Our present invention relates to a transmission path for a communication system operating with pulsed signals of the PAM (pulse-amplitude modulated) or TDM (time-division multiplex) type.

BACKGROUND OF THE INVENTION

In commonly owned U.S. Pat. Nos. 3,878,485 and 3,973,227, in the name of Paolo Erculiani, there has been described a transmission path of this type comprising several conductors separated by layers of a substantially nonpolarizable dielectric material, such as polyethylene or Teflon, the conductors being much thinner than the invtervening dielectric layers and having a maximum effective thickness on the order of magnitude of the penetration depth $\delta$ of an alternating current at a frequency in the kHz range. The penetration $\delta$ is given by a formula disclosed in these two patents.

The conductors referred to can be either cylindrically coaxial or flat (see especially FIG. 7 of each of the two Erculiani patents). Coaxial lines of this description are difficult to manufacture and are therefore generally limited to two cylindrical conductors whereas a flat line can be conveniently assembled from three metal foils with two intervening dielectric layers forming a stack, preferably with conductive interconnection of the two outer foils, as likewise suggested in the Erculiani patents. If it were practical to construct a three-conductor coaxial signal path of this type, the intervening dielectric layers would constitute a homogeneous medium in which the magnetic lines of force from closed loops around the conductor axis. While a stack of flat conductors may be considered part of a coaxial line with infinite radius, the necessarily finite width of the stack creates discontinuities along its sides with resulting nonuniform current distribution within each conductor. In fact, the eddy currents developing along the conductor edges reduce the density of the signal current in these regions whereby the effective line resistance is increased.

OBJECT OF THE INVENTION

The object of our present invention is to provide a three-conductor transmission path for a communication system of the above-identified type in which this drawback is avoided.

SUMMARY OF THE INVENTION

We realize this object, in accordance with our present invention, by providing a stack of substantially rectangular cross-section formed from a flat elongate inner conductor bracketed by two flat elongate outer conductors of substantially the same width, the conductors being separated by dielectric layers of similar width as in the above-identified Erculiani patents, in combination with ferromagnetic elements alongside the stack serving to maintain the lines of force of a magnetic field substantially parallel to the conductors at the minor sides of the cross-section, i.e. in a region where these lines of force would otherwise deviate from such parallelism on account of the discontinuity existing at the lateral boundaries of the dielectric layers.

Advantageously, the ferromagnetic elements extend across the two outer conductors on both sides of the stack and in close contact therewith. Naturally, these elements must not short-circuit the three conductors if their edges are exposed at the narrow sides of the stack. We therefore prefer to make these elements of a highly resistive material, namely ferrite, so that they will not create any short circuits even when in direct contact with the conductors.

BRIEF DESCRIPTION OF THE DRAWING

The above and other features of our invention will now be described in detail with reference to the accompanying drawing in which.

SPECIFIC DESCRIPTION

Figure 1:
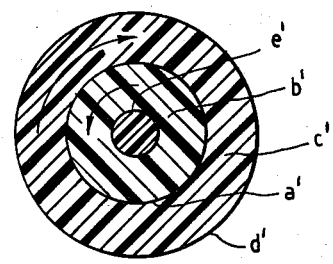
FIG. 1 is a diagrammatic cross-section view of a hypothetical three-conductor coaxial transmission path.

In FIG. 1 we have schematically illustrated a coaxial transmission path with three cylindrical conductors $e'$, $a'$ and $d'$ separated by intervening dielectric layers $b'$ and $c'$ of substantially greater thickness. When the middle conductor $a'$ and the interconnected conductors $d'$, $e'$ are oppositely traversed by direct current, the magnetic flux circulates within layers $b'$ and $c'$ in mutually opposite directions as indicated by the arrows. The two fluxes are well separated by the shielding effect of the middle conductor $a'$. The three conductors are assumed to have a thickness not exceeding the penetration depth $\delta$ as discussed above.

While the coaxial signal path of FIG. 1 is theoretically interesting, the present state of the art does not make its realization practical since the low-hysteresis dielectric material of its insulating layers $b'$ and $c'$—preferably polytetrafluoroethylene (Teflon)—is very difficult to metallize.

Figure 2:
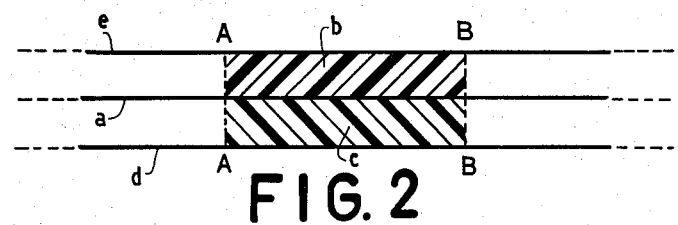
FIG. 2 is a similar cross-sectional view of a flat transmission path generally analogous to the coaxial path of FIG. 1.

FIG. 2 illustrates a flat transmisson path with planar conductors $a'$, $d$ and $e$ separated from one another by intervening dielectric layers $b$ and $c$, in a manner analogous to the assembly of FIG. 1. Since these flat conductors can be readily made from metallic foils, the difficulties encountered with coaxial conductors do not arise. If it were possible to make the conductors infinitely wide, as indicated in dotted lines, the magnetic field existing between them would be uniform as in the structure of FIG. 1. In practice, of course, the stack formed from layers $a$–$e$ must be of finite width, with lateral boundaries indicated at A—A and B—B. The discontinuity of the dielectric medium existing at these boundaries results in an irregular magnetic field as has been illustrated in FIG. 3 for the right-hand half of the stack shown in FIG. 2.

Figure 3:
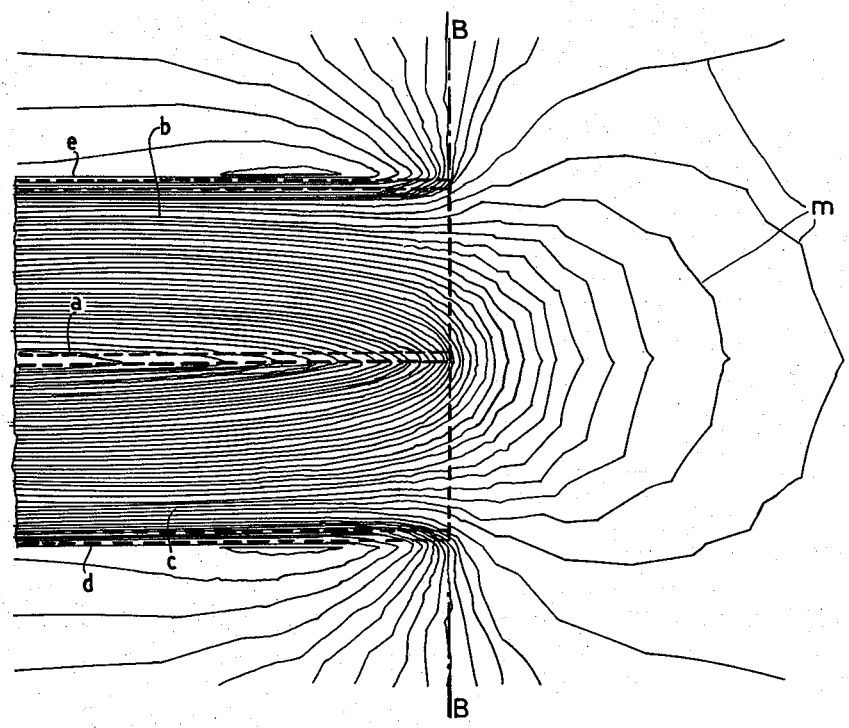
FIG. 3 is an enlarged view of the right-hand half of FIG. 2, showing the equipotential curves of the magnetic vector present upon the passage of a direct current through the transmission path.

The magnetic lines of force m of FIG. 3 represent equipotential curves which come into existence upon the passage of a direct current through conductors a, e and d, with the outer conductors d and e again interconnected so that the current flows through them in a direction opposite that of the flow through inner conductor a. The location of these curves has been determined by a computer whose digital mode of operation causes them to assume a broken shape; they approximate, however, the actual lines of force of the magnetic flux. It will be noted that these flux lines are substantially parallel to one another, and to the planar conductors a, d and e, in the interior of each layer b and c but begin to diverge as they approach the lateral edge B—B of the stack. Beyond that edge, only some of the flux lines m form closed loops around inner conductor a while others follow stray paths partly curving around outer conductors d and e. As the magnetic potential along these flux lines changes in magnitude with the leading and trailing edges of the transmitted current pulses, eddy currents are induced at the conductor edges which, as discussed above, oppose the flow of signal current near the sides of the stack and thus effectively increase the resistance of the transmission path.

Figure 4:
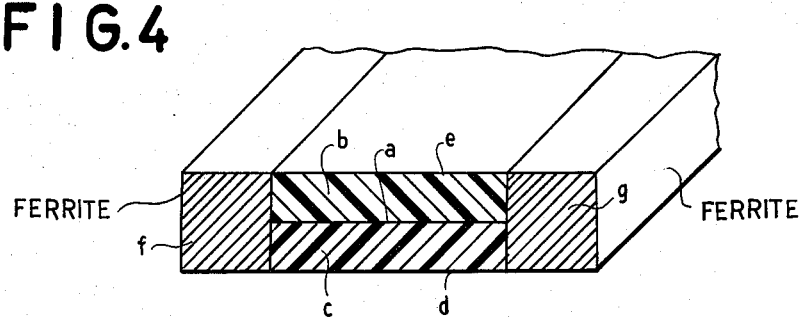
FIG. 4 is a fragmentary perspective view of the transmission path of FIG. 2 modified in accordance with our present improvement.

We have found, in accordance with our present invention, that ferromagnetic elements disposed alongside the stack a–e can control the course of these flux lines to prevent them from straying in the manner illustrated in FIG. 3. As shown in FIG. 4, such ferromagnetic elements advantageously take the form of two ferrite strips f and g of high magnetic permeability which flank the stack and are preferably in contact therewith.

Figure 5:
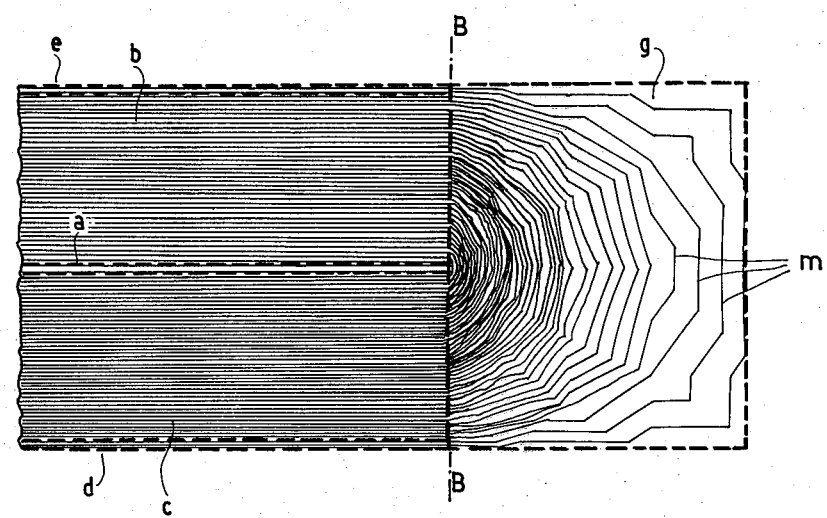
FIG. 5 is a view similar to FIG. 3 but showing the magnetic equipotential curves for the modified transmission path of FIG. 4.

In FIG. 5 we have traced the magnetic flux lines m, again as determined by computer, in the presence of ferrite strip g adjacent the stack boundary B—B. It will be seen that no flux line escapes from the assembly and that they all form closed loops within the strip g while lying parallel to the conductors a, d and e throughout the width of dielectric layers b and c. Thus, the flux lines do not close around the outer conductors d and e so as not to induce any eddy currents therein. The behavior of the flat transmission path shown in FIG. 4 is therefore electrically equivalent to that of the coaxial assembly of FIG. 1.

Figure 6:
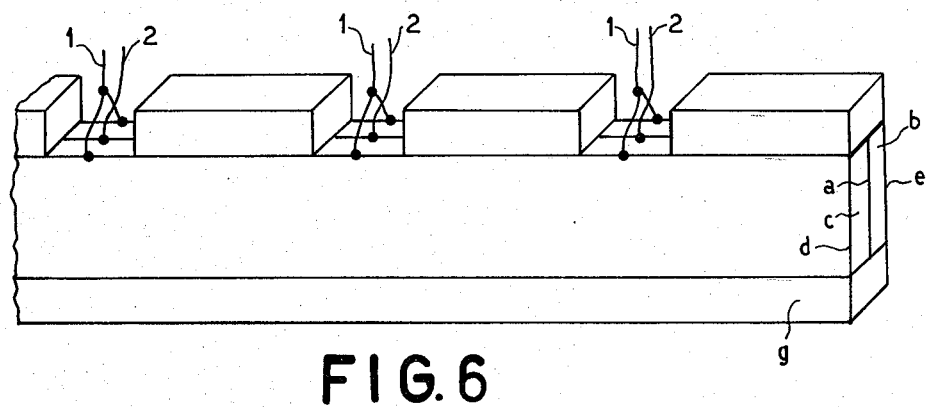
FIG. 6 is a fragmentary side view of a larger section of the transmission path shown in FIG. 4.

We have found that the connection of the emerging flux lines within ferrite strips f and g is not significantly affected by a subdivision of either or both of these strips into sections separated by smaller gaps, as illustrated for the strip f in FIG. 6. These gaps give access to the inner conductor a at various points along the path and also facilitate connections to the outer conductors d and e. Thus, we have shown branch leads 1 and 2 soldered in each gap to conductors d, e and conductor a, respectively, for tapping off or feeding in signals.

It will be understood that foils d and e need not be exposed, as shown, but could be overlain by additional insulation of preferably the same material as layers b and c, substantially in the manner illustrated in the two commonly owned Erculiani patents referred to above.

To the extent that the magnetic permeability of ferrite strips f and g is constant throughout the range of operating frequencies, the transmission path according to our invention has a frequency-independent impedance.

We claim:

1. A transmission path for a communication system operating with pulsed signals, comprising:
    a flat elongate inner conductor and two flat elongate outer conductors bracketing said inner conductor, said inner and outer conductors being substantially coextensive in width, the effective thickness of each of said conductors in a common transverse plane being at most on the order of magnitude of the penetration depth of an alternating current at a frequency in the kHz range;
    two dielectric layers of substantially the same width as said conductors and of greater thickness than the latter separating said inner conductor from said outer conductors, thereby forming with said conductors a stack of substantially rectangular cross-section; and
    ferromagnetic elements alongside said stack for maintaining the lines of force of a magnetic field, generated by said pulse signals, substantially parallel to said conductors at the minor sides of said cross-section.

2. A transmission path as defined in claim 1 wherein said ferromagnetic elements extend across said outer conductors on both sides of said stack and in close contact therewith.

3. A transmission path as defined in claim 2 wherein said ferromagnetic elements are ferrite strips.

4. A transmission path as defined in claim 3 wherein at least one of said ferrite strips is longitudinally subdivided into sections separated by narrow gaps, further comprising branch leads connected to said conductors in said gaps.

5. A transmission path as defined in claims 1, 2, 3 or 4 wherein said dielectric layers consist of polytetrafluoroethylene.

* * * * *